(12) United States Patent
Kook et al.

(10) Patent No.: US 9,702,439 B2
(45) Date of Patent: Jul. 11, 2017

(54) PLANETARY GEAR TRAIN OF AUTOMATIC TRANSMISSION FOR VEHICLE

(71) Applicant: Hyundai Motor Company, Seoul (KR)

(72) Inventors: Jae Chang Kook, Hwaseong-si (KR); Sueng Ho Lee, Seoul (KR); Dong Hwan Hwang, Seoul (KR); SeokJin Kim, Hwaseong-si (KR); Seongwook Ji, Ansan-si (KR); Wonmin Cho, Hwaseong-si (KR); Hyun Sik Kwon, Seoul (KR); Jong Sool Park, Hwaseong-si (KR); Kyeong Hun Lee, Seoul (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/181,233

(22) Filed: Jun. 13, 2016

(65) Prior Publication Data

US 2017/0159758 A1 Jun. 8, 2017

(30) Foreign Application Priority Data

Dec. 2, 2015 (KR) .................... 10-2015-0170986

(51) Int. Cl.
*F16H 3/66* (2006.01)

(52) U.S. Cl.
CPC ....... *F16H 3/66* (2013.01); *F16H 2200/0065* (2013.01); *F16H 2200/2012* (2013.01); *F16H 2200/2046* (2013.01)

(58) Field of Classification Search
CPC .............. F16H 3/66; F16H 2200/2046; F16H 2200/2012; F16H 2200/0065
USPC ........................................ 475/275–291, 330
See application file for complete search history.

(56) References Cited

U.S. PATENT DOCUMENTS

| 7,575,533 B2 | 8/2009 | Gumpoltsberger | |
| 2008/0274853 A1* | 11/2008 | Raghavan | F16H 3/66 475/286 |
| 2009/0239699 A1* | 9/2009 | Baldwin | F16H 3/66 475/276 |
| 2012/0149523 A1* | 6/2012 | Wittkopp | F16H 3/666 475/271 |
| 2016/0333971 A1* | 11/2016 | Cho | F16H 3/66 |
| 2016/0333980 A1* | 11/2016 | Cho | F16H 3/66 |

* cited by examiner

*Primary Examiner* — Roger Pang
(74) *Attorney, Agent, or Firm* — Morgan Lewis & Bockius LLP

(57) ABSTRACT

Nine or more forward speeds and at least one reverse speed are achieved by a planetary gear train of an automatic transmission for a vehicle including an input shaft, an output shaft, four planetary gear sets respectively having three rotational elements, and six control elements for selectively interconnecting the rotational elements.

11 Claims, 2 Drawing Sheets

FIG. 2

| shift-stage | control element | | | | | | gear ratio | step ratio | gear ratio span |
|---|---|---|---|---|---|---|---|---|---|
| | C1 | C2 | C3 | B1 | B2 | B3 | | | |
| D1 | | | | ● | | ● | 5.393 | | 8.704 |
| D2 | | | ● | ● | | | 3.403 | 1.585 | |
| D3 | ● | | | ● | | | 2.175 | 1.565 | |
| D4 | ● | | | ● | | | 1.634 | 1.331 | |
| D5 | | ● | | | ● | | 1.391 | 1.175 | |
| D6 | | ● | | | ● | | 1.219 | 1.141 | |
| D7 | ● | | | | | ● | 1.000 | 1.219 | |
| D8 | ● | | | | | ● | 0.774 | 1.291 | |
| D9 | | | | | | ● | 0.620 | 1.250 | |
| REV | | | | | ● | ● | -4.839 | | |

PLANETARY GEAR TRAIN OF AUTOMATIC TRANSMISSION FOR VEHICLE

CROSS-REFERENCE TO RELATED APPLICATION

The present application claims priority to and the benefit of Korean Patent Application No. 10-2015-0170986 filed on Dec. 2, 2015, the entire contents of which is incorporated herein for all purposes by this reference.

BACKGROUND OF THE INVENTION

Field of the Invention

The present invention relates to an automatic transmission for a vehicle.

Description of Related Art

Recent increases in oil prices are triggering hard competition in enhancing fuel consumption of a vehicle.

In this sense, research on an engine has been undertaken to achieve weight reduction and to enhance fuel consumption by so-called downsizing and research on an automatic transmission has been performed to simultaneously provide better drivability and fuel consumption by achieving more shift stages.

In order to achieve more shift stages for an automatic transmission, the number of parts is typically increased, which may deteriorate installability, production cost, weight and/or power flow efficiency.

Therefore, in order to maximally enhance fuel consumption of an automatic transmission having more shift stages, it is important for better efficiency to be derived by a smaller number of parts.

In this respect, an eight-speed automatic transmission has been recently introduced, and a planetary gear train for an automatic transmission enabling more shift stages is under investigation.

Considering that gear ratio spans of recently developed eight-speed automatic transmissions are typically between 6.5 and 7.5, fuel consumption enhancement is not very large.

In the case of a gear ratio span of an eight-speed automatic transmission having a level above 9.0, it is difficult to maintain step ratios between adjacent shift stages to be linear, by which driving efficiency of an engine and drivability of a vehicle deteriorated.

Thus, research studies are underway for developing a high efficiency automatic transmission having nine or more speeds.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of, by minimal complexity, realizing at least forward ninth speeds and at least one reverse speed, increasing a gear ratio span so as to improve power delivery performance and fuel consumption, and achieving linearity of shift stage step ratios.

An exemplary planetary gear set according to an embodiment includes
an input shaft for receiving an engine torque, an output shaft for outputting a shifted torque, a first planetary gear set having first, second, and third rotational elements, a second planetary gear set having fourth, fifth, and sixth rotational elements, a third planetary gear set having seventh, eighth, and ninth rotational elements, a fourth planetary gear set having tenth, eleventh, and twelfth rotational elements, and six control elements for selectively interconnecting the rotational elements.

The input shaft may be continuously connected with the third rotational element, The output shaft may be continuously connected with the eleventh rotational element, The first rotational element may be continuously connected with the fourth rotational element, The second rotational element may be continuously connected with the eighth rotational element and twelfth rotational element, The fifth rotational element may be continuously connected with the tenth rotational element. The sixth rotational element may be continuously connected with the seventh rotational element.

The first rotational element may be selectively connectable with the eleventh rotational element. The second rotational element may be selectively connectable with the third rotational element. The sixth rotational element may be selectively connectable with the ninth rotational element. The fifth rotational element may be selectively connectable with the transmission housing. The sixth rotational element may be selectively connectable with the transmission housing. The ninth rotational element may be selectively connectable with the transmission housing.

The first, second, and third rotational elements of the first planetary gear set may respectively be a sun gear, a planet carrier, and a ring gear of the first planetary gear set. The fourth, fifth, and sixth rotational elements of the second planetary gear set may respectively be a sun gear, a planet carrier, and a ring gear of the second planetary gear set. The seventh, eighth, and ninth rotational elements of the third planetary gear set may respectively be a sun gear, a planet carrier, and a ring gear of the third planetary gear set. The tenth, eleventh, and twelfth rotational elements of the fourth planetary gear set may respectively be a sun gear, a planet carrier, and a ring gear of the fourth planetary gear set.

A planetary gear train according to an exemplary embodiment of the present invention may realize at least forward ninth speeds and at least one reverse speed formed by operating the four planetary gear sets as simple planetary gear sets by controlling six control elements.

In addition, a planetary gear train according to an exemplary embodiment of the present invention may realize a gear ratio span of more than 8.7, thereby maximizing efficiency of driving an engine.

In addition, the linearity of step ratios of shift stages is secured while multi-staging the shift stage with high efficiency, securing linearity of step ratios of shift stages, thereby making it possible to improve drivability such as acceleration before and after a shift, an engine speed rhythmic sense, and the like.

Further, effects that can be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart for respective control elements at respective shift stages in a planetary gear train according to an exemplary embodiment of the present invention.

Figure 1:
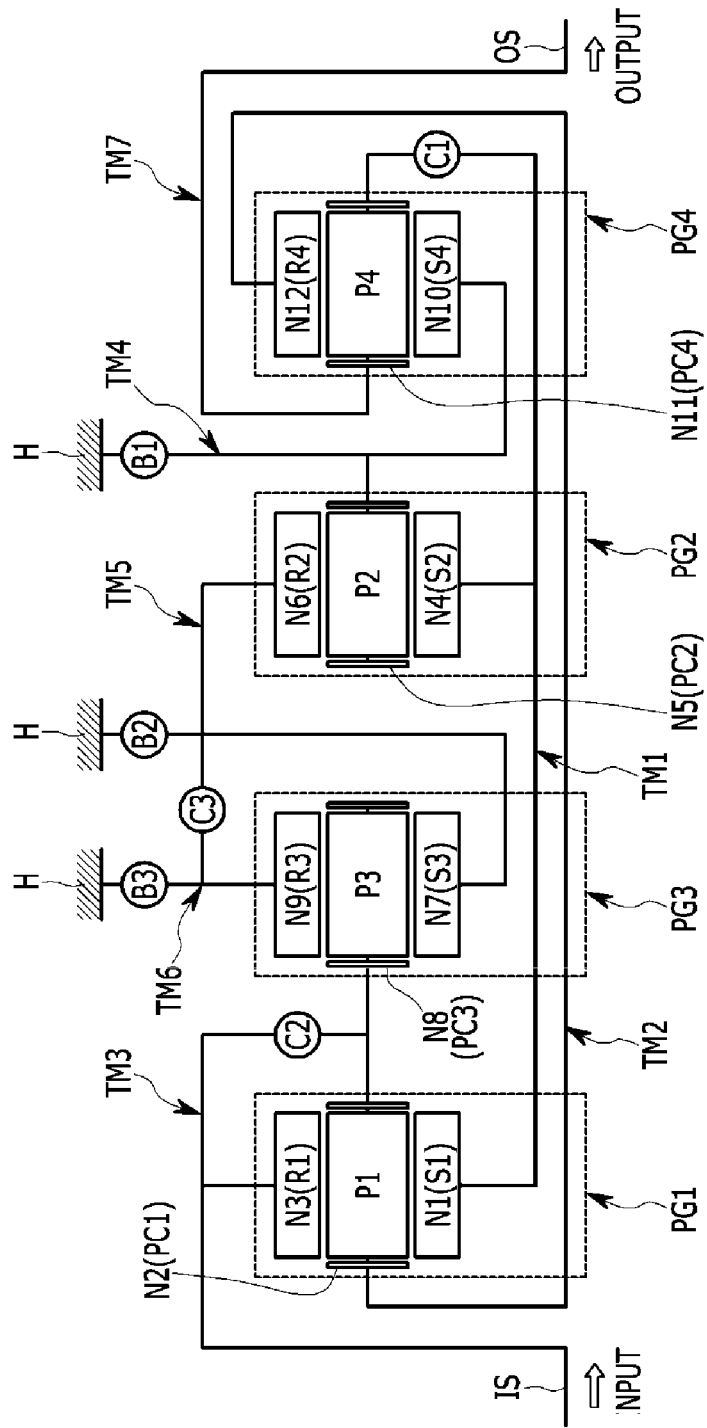
FIG. 1 is a schematic diagram of a planetary gear train according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In the following description, dividing names of components into first, second, and the like is to divide the names because the names of the components are the same as each other and an order thereof is not particularly limited.

FIG. 1 is a schematic diagram of a planetary gear train according to an exemplary embodiment of the present invention.

Referring to FIG, a planetary gear train according to an exemplary embodiment of the present invention includes first, second, third, and fourth planetary gear sets PG1, PG2, PG3, and PG4 arranged on a same axis, an input shaft IS, an output shaft OS, seven connecting members TM1 to TM7 for interconnecting rotational elements of the first, second, third, and fourth planetary gear sets PG1, PG2, PG3, and PG4, six control elements C1 to C3 and B1 to B3, and a transmission housing H.

Torque input from the input shaft IS is shifted by cooperative operation of the first, second, third, and fourth planetary gear sets PG1, PG2, PG3, and PG4, and then output through the output shaft OS.

The simple planetary gear sets are arranged in the order of first, first, third, second, fourth planetary gear sets (PG1, PG3, PG2, PG4), from an engine side.

The input shaft IS is an input member and the torque from a crankshaft of an engine, after being torque-converted through a torque converter, is input into the input shaft IS.

The output shaft OS is an output member, and being arranged on a same axis with the input shaft IS, delivers a shifted torque to a drive shaft through a differential apparatus.

The first planetary gear set PG1 is a single pinion planetary gear set, and includes a first sun gear S1, a first planet carrier PC1 that supports a first pinion P1 externally engaged with the first sun gear S1, and a first ring gear R1 internally engaged with the first pinion P1. The first sun gear S1 acts as a first rotational element N1, the first planet carrier PC1 acts as a second rotational element N2, and the first ring gear R1 acts as a third rotational element N3.

The second planetary gear set PG2 is a single pinion planetary gear set, and includes a second sun gear S2, a second planet carrier PC2 that supports a second pinion P2 externally engaged with the second sun gear S2, and a second ring gear R2 internally engaged with the second pinion P2. The second sun gear S2 acts as a fourth rotational element N4, the second planet carrier PC2 acts as a fifth rotational element N5, and the second ring gear R2 acts as a sixth rotational element N6.

The third planetary gear set PG3 is a single pinion planetary gear set, and includes a third sun gear S3, a third planet carrier PC3 that supports a third pinion P3 externally engaged with the third sun gear S3, and a third ring gear R3 internally engaged with the third pinion P3. The third sun gear S3 acts as a seventh rotational element N7, the third planet carrier PC3 acts as an eighth rotational element N8, and the third ring gear R3 acts as a ninth rotational element N9.

The fourth planetary gear set PG4 is a single pinion planetary gear set, and includes a fourth sun gear S4, a fourth planet carrier PC4 that supports a fourth pinion P4 externally engaged with the fourth sun gear S4, and a fourth ring gear R4 internally engaged with the fourth pinion P4. The fourth sun gear S4 acts as a tenth rotational element N10, the fourth planet carrier PC4 acts as an eleventh rotational element N11, and the fourth ring gear R4 acts as a twelfth rotational element N12.

In the arrangement of the first, second, third, and fourth planetary gear sets PG1, PG2, PG3, and PG4, the first rotational element N1 is directly connected with the seventh rotational element N7, the second rotational element N2 is directly connected with the fifth rotational element N5 and the twelfth rotational element N12, and the fourth rotational element N4 is directly connected with the ninth rotational element N9, the eighth rotational element N8 is directly connected with tenth rotational element N10, by seven connecting members TM1 to TM7.

The seven connecting members TM1 to TM7 are arranged as follows.

The first connecting member TM1 is connected with the first rotational element N1 (first sun gear S1) and the fourth rotational element N4 (second sun gear S2).

The second connecting member TM2 is connected with the second rotational element N2 (first planet carrier PC1) and eighth rotational element N8 (third planet carrier PC3) and the twelfth rotational element N12 (fourth ring gear R4).

The third connecting member TM3 is connected with the third rotational element N3 (first ring gear R1), directly connected with the input shaft IS thereby continuously acting as an input element, and selectively connectable with the second connecting member TM2.

The fourth connecting member TM4 is connected with the fifth rotational element N5 (second planet carrier PC2) and the tenth rotational element N10 (fourth sun gear S4), and selectively connectable with the transmission housing H thereby acting as a selective fixed element.

The fifth connecting member TM5 is connected with the sixth rotational element N6 (second ring gear R2) and the seventh rotational element N7 (third sun gear S3), and selectively connectable with the transmission housing H, thereby acting as a selective fixed element.

The sixth connecting member TM5 is connected with the ninth rotational element N9 (third ring gear R3), selectively connectable with the transmission housing H thereby acting as a selective fixed element, and selectively connectable with the fifth connecting member TM5.

The seventh connecting member TM7 is connected with the eleventh rotational element N11 (fourth planet carrier PC4), selectively connectable with the first connecting member TM1, and directly connected with the output shaft OS thereby continuously acting as an output element.

The connecting members TM1 to TM7 may be selectively interconnected with one another by control elements of three clutches C1, C2, and C3.

, The connecting members TM1 to TM7 may be selectively connectable with the transmission housing H, by control elements of three brakes B1, B2, and B3.

The six control elements C1 to C3 and B1 to B3 are arranged as follows.

The first clutch C1 is arranged between the first connecting member TM1 and the seventh connecting member TM7, such that the first connecting member TM1 and the seventh connecting member TM7 may selectively become integral.

The second clutch C2 is arranged between the second connecting member TM2 and the third connecting member TM3, such that the second connecting member TM2 and the third connecting member TM3 may selectively become integral.

The third clutch C3 is arranged between the fifth connecting member TM5 and the sixth connecting member TM6, such that the fifth connecting member TM5 and the sixth connecting member TM6 may selectively become integral.

The first brake B1 is arranged between the fourth connecting member TM4 and the transmission housing H, such that the fourth connecting member TM4 may selectively act as a fixed element.

The second brake B2 is arranged between the fifth connecting member TM5 and the transmission housing H, such that the fifth connecting member TM5 may selectively act as a fixed element.

The third brake B3 is arranged between the sixth connecting member TM6 and the transmission housing H, such that the sixth connecting member TM6 may selectively act as a fixed element.

The control elements of the first, second, and third clutches C1, C2, and C3 and the first, second, and third brakes B1, B2, and B3 may be realized as multi-plate hydraulic pressure friction devices that are frictionally engaged by hydraulic pressure.

FIG. 2 is an operational chart for respective control elements at respective shift stages in a planetary gear train according to an exemplary embodiment of the present invention.

As shown in FIG. 2, a planetary gear train according to an exemplary embodiment of the present invention performs shifting by operating two control elements at respective shift stages.

In the forward first speed shift stage D1, the first and third brakes B1 and B3 are simultaneously operated. As a result, torque of the input shaft IS is input to the third connecting member TM3, and the fourth connecting member TM4 and the sixth connecting member TM6 simultaneously act as fixed elements by the operation of the first and third brakes B1 and B3, thereby realizing the forward first speed by cooperative operation of respective connecting members and outputting a shifted torque through the output shaft OS connected with the seventh connecting member TM7.

In the forward second speed shift stage D2, the third clutch C3 and the first brake B1 are simultaneously operated. As a result, torque of the input shaft IS is input to the third connecting member TM3, and the fifth connecting member TM5 becomes integral with the sixth connecting member TM6 by the operation of the third clutch C3. In addition, the fourth connecting member TM4 acts as a fixed element by the operation of the first brake B1, thereby realizing the forward second speed by cooperative operation of respective connecting members and outputting a shifted torque through the output shaft OS connected with the seventh connecting member TM7.

In the forward third speed shift stage D3, the first and second brakes B1 and B2 are simultaneously operated. As a result, torque of the input shaft IS is input to the third connecting member TM3, the fourth connecting member TM4 and the fifth connecting member TM5 simultaneously act as fixed elements by the operation of the first and second brakes B1 and B2, thereby realizing the forward third speed by cooperative operation of respective connecting members and outputting a shifted torque through the output shaft OS connected with the seventh connecting member TM7.

In the forward fourth speed shift stage D4, the first clutch C1 and the first brake B1 are simultaneously operated. As a result, torque of the input shaft IS is input to the third connecting member TM3, and the first connecting member TM1 becomes integral with the seventh connecting member TM7 by the operation of the first clutch C1. In addition, the fourth connecting member TM4 acts as a fixed element by the operation of the first brake B1, thereby realizing the forward fourth speed by cooperative operation of respective connecting members and outputting a shifted torque through the output shaft OS connected with the seventh connecting member TM7.

In the forward fifth speed shift stage D5, the first clutch C1 and the second brake B2 are simultaneously operated. As a result, torque of the input shaft IS is input to the third connecting member TM3, and the first connecting member TM1 becomes integral with the seventh connecting member TM7 by the operation of the first clutch C1. In addition, the fifth connecting member TM5 acts as a fixed element by the operation of the second brake B2, thereby realizing the forward fifth speed by cooperative operation of respective connecting members and outputting a shifted torque through the output shaft OS connected with the seventh connecting member TM7.

In the forward sixth speed shift stage D6, the second clutch C2 and the second brake B2 are simultaneously operated. As a result, torque of the input shaft IS is input to the third connecting member TM3, and the second connecting member TM2 becomes integral with the third connecting member TM3 by the operation of the second clutch C2. In addition, the fifth connecting member TM5 acts as a fixed element by the operation of the second brake B2, thereby realizing the forward sixth speed by cooperative operation of respective connecting members and outputting a shifted torque through the output shaft OS connected with the seventh connecting member TM7.

In the forward seventh speed shift stage D7, the first and second brakes C1 and C2 are simultaneously operated. As a result, torque of the input shaft IS is input to the third connecting member TM3, and the first planetary gear set PG1 becomes integral by the operation of the second clutch C2. In addition, the first connecting member TM1 becomes integral with the seventh connecting member TM7 by the operation of the first clutch C1, thereby realizing the forward seventh speed and outputting an inputted torque through the output shaft OS connected with the seventh connecting member TM7.

In the forward eighth speed shift stage D8, the second clutch C2 and the third brake B3 are simultaneously operated. As a result, torque of the input shaft IS is input to the third connecting member TM3, and the second connecting member TM2 becomes integral with the third connecting member TM3 by the operation of the second clutch C2. In addition, the sixth connecting member TM6 acts as a fixed element by the operation of the third brake B3, thereby realizing the forward eighth speed by cooperative operation of respective connecting members and outputting a shifted torque through the output shaft OS connected with the seventh connecting member TM7.

In the forward ninth speed shift stage D9, the first clutch C1 and the third brake B3 are simultaneously operated. As a result, torque of the input shaft IS is input to the third connecting member TM3, and the first connecting member TM1 becomes integral with the seventh connecting member TM7 by the operation of the first clutch C1. In addition, the sixth connecting member TM6 acts as a fixed element by the operation of the third brake B3, thereby realizing the forward ninth speed by cooperative operation of respective connecting members and outputting a shifted torque through the output shaft OS connected with the seventh connecting member TM7.

In the reverse speed REV, the second and the third brakes B2 and B3 are simultaneously operated. As a result, torque of the input shaft IS is input to the third connecting member TM3, and the fifth connecting member TM5 and the sixth connecting member TM6 simultaneously act as fixed elements by the operation of the second and the third brakes B2 and B3, thereby realizing the reverse speed by cooperative operation of respective connecting members and outputting a shifted torque through the output shaft OS connected with the seventh connecting member TM7.

As described above, a planetary gear train according to an exemplary embodiment of the present invention may realize the forward nine speeds and one reverse speed formed by operating the four planetary gear sets PG1, PG2, PG3, and PG4 by controlling three clutches C1, C2, and C3 and three brakes B1, B2, and B3.

In addition, a planetary gear train according to an exemplary embodiment of the present invention may realize a gear ratio span of more than 8.7, thereby maximizing efficiency of driving an engine.

In addition, the linearity of step ratios of shift stages is secured while multi-staging the shift stage with high efficiency, thereby making it possible to improve drivability such as acceleration before and after a shift, an engine speed rhythmic sense, and the like.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear set of an automatic transmission for a vehicle, comprising:
    an input shaft for receiving an engine torque;
    an output shaft for outputting a shifted torque;
    a first planetary gear set having first, second, and third rotational elements;
    a second planetary gear set having fourth, fifth, and sixth rotational elements;
    a third planetary gear set having seventh, eighth, and ninth rotational elements;
    a fourth planetary gear set having tenth, eleventh, and twelfth rotational elements; and
    six control elements, each for selectively interconnecting the first, second, third, fourth, fifth, sixth, seventh, eighth, ninth, tenth, eleventh, and twelfth rotational elements,
    wherein the input shaft is continuously connected with the third rotational element,
    the output shaft is continuously connected with the eleventh rotational element,
    the first rotational element is continuously connected with the fourth rotational element,
    the second rotational element is continuously connected with the eighth rotational element and twelfth rotational element,
    the fifth rotational element is continuously connected with the tenth rotational element, and
    the sixth rotational element is continuously connected with the seventh rotational element.

2. The planetary gear set of claim 1, wherein
    the first rotational element is selectively connectable with the eleventh rotational element;
    the second rotational element is selectively connectable with the third rotational element;
    the sixth rotational element is selectively connectable with the ninth rotational element;
    the fifth rotational element is selectively connectable with the transmission housing;
    the sixth rotational element is selectively connectable with the transmission housing; and
    the ninth rotational element is selectively connectable with the transmission housing.

3. The planetary gear set of claim 1, wherein
the first, second, and third rotational elements of the first planetary gear set are respectively a sun gear, a planet carrier, and a ring gear of the first planetary gear set;
the fourth, fifth, and sixth rotational elements of the second planetary gear set are respectively a sun gear, a planet carrier, and a ring gear of the second planetary gear set;
the seventh, eighth, and ninth rotational elements of the third planetary gear set are respectively a sun gear, a planet carrier, and a ring gear of the third planetary gear set; and
the tenth, eleventh, and twelfth rotational elements of the fourth planetary gear set are respectively a sun gear, a planet carrier, and a ring gear of the fourth planetary gear set.

4. A planetary gear set of an automatic transmission for a vehicle, comprising:
an input shaft for receiving an engine torque;
an output shaft for outputting a shifted torque;
a first planetary gear set having first, second, and third rotational elements;
a second planetary gear set having fourth, fifth, and sixth rotational elements;
a third planetary gear set having seventh, eighth, and ninth rotational elements;
a fourth planetary gear set having tenth, eleventh, and twelfth rotational elements;
six control elements, each for selectively interconnecting the first, second, third, fourth, fifth, sixth, seventh, eighth, ninth, tenth, eleventh, and twelfth rotational elements;
a first connecting member connected with the first rotational element and the fourth rotational element;
a second connecting member connected with the second rotational element, the eighth rotational element, and the twelfth rotational element;
a third connecting member connected with the third rotational element, directly connected with the input shaft, and selectively connectable with the second connecting member;
a fourth connecting member connected with the fifth rotational element and the tenth rotational element, and selectively connectable with the transmission housing;
a fifth connecting member connected with the sixth rotational element and the seventh rotational element, selectively connectable with the transmission housing;
a sixth connecting member connected with the ninth rotational element, selectively connectable with the fifth connecting member, and selectively connectable with the transmission housing; and
a seventh connecting member connected with the eleventh rotational element, selectively connectable with the first connecting member, and continuously connected with the output shaft.

5. The planetary gear set of claim 4, wherein
the first planetary gear set is a single pinion planetary gear set, where the first rotational element is a first sun gear, the second rotational element is a first planet carrier, and the third rotational element is a first ring gear;
the second planetary gear set is a single pinion planetary gear set, where the fourth rotational element is a second sun gear, the fifth rotational element is a second planet carrier, and the sixth rotational element is a second ring gear;
the third planetary gear set is a single pinion planetary gear set, where the seventh rotational element is a third sun gear, the eighth rotational element is a third planet carrier, and the ninth rotational element is a third ring gear; and
the fourth planetary gear set is a single pinion planetary gear set, where the tenth rotational element is a fourth sun gear, the eleventh rotational element is a fourth planet carrier, and the twelfth rotational element is a fourth ring gear.

6. The planetary gear set of claim 5, wherein the first, second, third, and fourth planetary gear sets are arranged in the order of first, third, second, fourth planetary gear sets from an engine side to the output shaft.

7. The planetary gear set of claim 4, wherein the six control elements comprise
a first clutch selectively connecting the first connecting member and the seventh connecting member;
a second clutch selectively connecting the second connecting member and the third connecting member;
a third clutch selectively connecting the fifth connecting member and the sixth connecting member;
a first brake selectively connecting the fourth connecting member and the transmission housing;
a second brake selectively connecting the fifth connecting member and the transmission housing;
a third brake selectively connecting the sixth connecting member and the transmission housing.

8. The planetary gear set of claim 7, wherein shift stages realized by selective operation of two control elements among the six control elements comprise:
a forward first speed formed by simultaneous operation of the first brake and the third brake;
a forward second speed formed by simultaneous operation of the third clutch and the first brake;
a forward third speed formed by simultaneous operation of the first brake and the second brake;
a forward fourth speed formed by simultaneous operation of the first clutch and the first brake;
a forward fifth speed formed by simultaneous operation of the first clutch and the second brake;
a forward sixth speed formed by simultaneous operation of the second clutch and the second brake;
a forward seventh speed formed by simultaneous operation of the first clutch and the second clutch;
a forward eighth speed formed by simultaneous operation of the second clutch and the third brake;
a forward ninth speed formed by simultaneous operation of the first clutch and the third brake;
a reverse speed formed by simultaneous operation of the second brake and the third brake.

9. A planetary gear set of an automatic transmission for a vehicle, comprising:
an input shaft for receiving an engine torque;
an output shaft for outputting a shifted torque;
a first planetary gear set as a single pinion planetary gear set having first, second, and third rotational elements;
a second planetary gear set as a single pinion planetary gear set having fourth, fifth, and sixth rotational elements;
a third planetary gear set as a single pinion planetary gear set having seventh, eighth, and ninth rotational elements;
a fourth planetary gear set as a single pinion planetary gear set having tenth, eleventh, and twelfth rotational elements;
a first connecting member connected with the first rotational element and the fourth rotational element;

a second connecting member connected with the second rotational element, the eighth rotational element, and the twelfth rotational element;

a third connecting member connected with the third rotational element, directly connected with the input shaft, and selectively connectable with the second connecting member;

a fourth connecting member connected with the fifth rotational element and the tenth rotational element, and selectively connectable with the transmission housing;

a fifth connecting member connected with the sixth rotational element and the seventh rotational element, selectively connectable with the transmission housing;

a sixth connecting member connected with the ninth rotational element, selectively connectable with the fifth connecting member, and selectively connectable with the transmission housing;

a seventh connecting member connected with the eleventh rotational element, selectively connectable with the first connecting member, and continuously connected to the output shaft;

a first clutch selectively connecting the first connecting member and the seventh connecting member;

a second clutch selectively connecting the second connecting member and the third connecting member;

a third clutch selectively connecting the fifth connecting member and the sixth connecting member;

a first brake selectively connecting the fourth connecting member and the transmission housing;

a second brake selectively connecting the fifth connecting member and the transmission housing;

a third brake selectively connecting the sixth connecting member and the transmission housing.

10. The planetary gear set of claim 9, wherein the first planetary gear set includes a first sun gear as the first rotational element, a first planet carrier as the second rotational element, and a first ring gear as the third rotational element;

the second planetary gear set includes a second sun gear as the fourth rotational element, a second planet carrier as the fifth rotational element, and a second ring gear as the sixth rotational element;

the third planetary gear set includes a third sun gear as the seventh rotational element, a third planet carrier as the eighth rotational element, and a third ring gear as the ninth rotational element; and the fourth planetary gear set includes a fourth sun gear as the tenth rotational element, a fourth planet carrier as the eleventh rotational element, and a fourth ring gear as the twelfth rotational element.

11. The planetary gear set of claim 9, wherein shift stages realized by selective operation of two control element among the six control elements of the three clutches and the three brakes comprise:

a forward first speed formed by simultaneous operation of the first brake and the third brake;

a forward second speed formed by simultaneous operation of the third clutch and the first brake;

a forward third speed formed by simultaneous operation of the first brake and the second brake;

a forward fourth speed formed by simultaneous operation of the first clutch and the first brake;

a forward fifth speed formed by simultaneous operation of the first clutch and the second brake;

a forward sixth speed formed by simultaneous operation of the second clutch and the second brake;

a forward seventh speed formed by simultaneous operation of the first clutch and the second clutch;

a forward eighth speed formed by simultaneous operation of the second clutch and the third brake;

a forward ninth speed formed by simultaneous operation of the first clutch and the third brake; and a reverse speed formed by simultaneous operation of the second brake and the third brake.

* * * * *